United States Patent

[11] 3,615,505

[72] Inventors Raphael Karel Van Poucke
Berchem;
Marcel Jacob Monbaliu, Mortsel; Gaston Jacob Benoy, Edegem, all of Belgium
[21] Appl. No. 806,715
[22] Filed Mar. 12, 1969
[45] Patented Oct. 26, 1971
[73] Assignee Gevaert-AGFA N.V.
Mortsel, Belgium
[32] Priority Apr. 10, 1968
[33] Great Britain
[31] 17222/68

[54] SILVER HALIDE EMULSION CONTAINING 2-PYRAZOLIN-5-ONE COLOR COUPLER
10 Claims, No Drawings

[52] U.S. Cl. .................................................. 96/56.5,
96/100, 260/310
[51] Int. Cl. ...................................................... G03c 7/00
[50] Field of Search ........................................... 96/100,
56.5

[56] References Cited
UNITED STATES PATENTS
2,369,489  2/1945  Porter et al. .................. 96/100
3,330,660  7/1967  Van Poucke et al. ........ 96/100

*Primary Examiner*—J. Travis Brown
*Attorney*—Alfred W. Breiner

ABSTRACT: Photographic materials comprising novel magenta forming 2-pyrazolin-5-one color couplers corresponding to the formula:

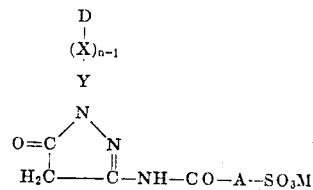

wherein:
Y stands for a bivalent aromatic group,
X stands for oxygen, sulfur sulphonyl,-SO$_2$N(R)-R being hydrogen or lower alkyl,-CONH-or-N(alkyl)-,
D represents a residue rendering the molecule fast to diffusion and comprising from five to 20 carbon atoms,
$n$ stands for 1 or 2,
A stands for

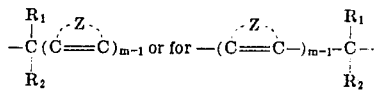

wherein $m=1$ or 2 and each of $R_1$ and $R_2$ stands for hydrogen, alkyl or aryl, $R_1$ and $R_2$ both being hydrogen when $m=2$, and Z represent the atoms necessary to complete an aromatic nucleus, and
M stands for hydrogen, an alkali metal atom or an ammonium group, are described. The materials have good stability to light, heat, and humidity and have good spectral characteristics,

SILVER HALIDE EMULSION CONTAINING 2-PYRAZOLIN-5-ONE COLOR COUPLER

This invention relates to color photography and the production of photographic color images by color development. It relates more particularly to novel magenta-forming 2-pyrazolin-5-one color couplers and to photographic elements containing said color couplers.

It is known that for the production of a photographic color image in a light-sensitive silver halide emulsion layer the exposed silver halide is developed to a silver image by means of an aromatic primary aminocompound in the presence of a color coupler which by reaction with the oxidized aminocompound forms a dye on the areas corresponding with the silver image.

In subtractive three-color photography usually a light-sensitive photographic color material is used comprising a red-sensitized, a green-sensitized and a blue-sensitive silver halide emulsion layer wherein on color development by means of suitable color couplers a cyan, a magenta and a yellow dye image are formed respectively.

One of the basic difficulties confronting color photography concerns the stability of the color couplers and the dyes formed therewith against light, heat and humidity. Although color photography has undergone much improvement in the recent past greater dye stability is still needed and sought after.

The use of various 2-pyrazolin-5-one derivatives for the production of the magenta image in three-color photography is well known, and the use of 1-aryl-3-acylamino-2-pyrazolin-5-ones for this purpose is described in numerous prior patent specifications.

Some of the known 2-pyrazolin-5-one color couplers are not so stable to light, heat and humidity while others form dyes having unfavorable spectral characteristics e.g. dyes having too little green absorption and too much red or blue absorption.

In accordance with the present invention novel magenta forming 2-pyrazolin-5-one color couplers are provided corresponding to the following general formula:

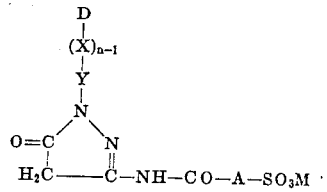

wherein:

Y is a bivalent aromatic group e.g. phenylene including a substituted bivalent aromatic group e.g. chlorophenylene, trifluoromethylphenylene, X is an oxygen atom, a sulfur atom, a sulphonyl group, a $-SO_2N(R)$ group, wherein R stands for hydrogen or lower alkyl, a $-CONH-$ group or a $-N(alky)-$ group, $n$ stands for 1 or 2, D is a group rendering the color coupler fast to diffusion such as an acyclic aliphatic group comprising from five to twenty carbon atoms,

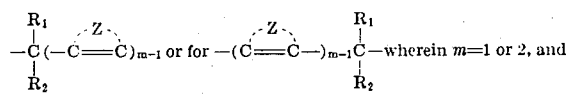

each of R and $R_2$ (the same or different) stands for hydrogen, alkyl or aryl, $R_1$ and $R_2$ both being hydrogen when $m=2$, and Z represents the atoms necessary to complete an aromatic nucleus e.g. phenylene, and M stands for hydrogen, an alkali metal atom or an ammonium group.

Apart from manifesting a favorable stability against light, heat and humidity the color couplers of the invention form magenta azomethine dyes which are also stable against light, heat and humidity and have very good spectral characteristics.

The color couplers for use according to the present invention and represented by the above general formula are prepared from the corresponding 1-aryl-3-amino-2-pyrazolin-5-ones as illustrated hereinafter. The 1-aryl-3-amino-2-pyrazolin-5-ones are prepared according to the methods known in the art by cyclisation of an appropriate hydrazine with e.g. the ethyl ester of β-imino-β-ethoxy-propionic acid. Many appropriate hydrazines are known and some are disclosed in, or can be made as described in British Pat. Specifications Nos. 1,086,988, 1,044,959 and 1,007,847.

The following are representative color couplers of the invention corresponding to the above general formula. However, it is to be understood that the invention is not limited to these specific couplers.

| Compound No.: | $-Y-(X)_{n-1}-D$ | $-A-SO_3M$ |
|---|---|---|
| 1 | ⟨phenyl⟩-SO₂N(CH₃)((CH₂)₁₅-CH₃) | -CH₂-⟨phenyl⟩-SO₃H |
| 2 | ⟨phenyl⟩-O(CH₂)₁₅-CH₃ | Same as above. |
| 3 | ⟨Cl-phenyl⟩-O-(CH₂)₁₅-CH₃ | Do. |
| 4 | ⟨phenyl⟩-SO₂-(CH₂)₁₅-CH₃ | Do. |
| 5 | Same as above. | -CH-⟨phenyl⟩ / SO₃Na |
| 6 | do. | -CH₂-SO₃Na |

| | −Y−(X)ₙ₋₁−D | −A−SO₂M |
|---|---|---|
| 7 | do | 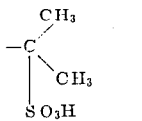 |
| 8 | do | 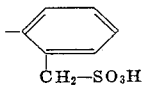 |
| 9 | 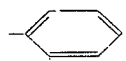 | Same as above. |
| 10 | Same as above | 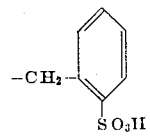 |
| 11 | do | 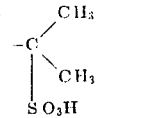 |
| 12 | do | −CH₂−SO₃H |
| 13 | do | 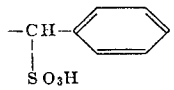 |
| 14 | 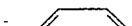 | Same as above. |
| 15 |  | Do. |
| 16 | Same as above | 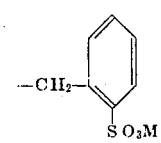 |
| 17 | do | −CH₂−SO₃H |
| 18 | do | 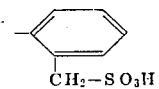 |
| 19 |  | Same as above. |
| 20 | do | 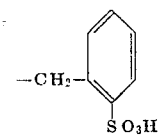 |
| 21 |  | Same as above. |
| 22 | Same as above | −CH₂−SO₃Na |
| 23 | do | 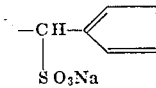 |

| | $-Y-(X)_{n-1}-D$ | $-A-SO_3M$ |
|---|---|---|
| 24 | —C₆H₄—SO₂—(CH₂)₁₅—CH₃ | Same as above. |
| 25 | Same as above | —CH₂—C₆H₄—SO₃H |
| 26 | do | —C(CH₃)₂—SO₃H |
| 27 | —C₆H₃(Cl)—SO₂—(CH₂)₁₅—CH₃ | Same as above. |
| 28 | Same as above | —C₆H₄—CH₂—SO₃H |
| 29 | do | —CH₂—SO₃H |
| 30 | do | —CH(SO₃H)—C₆H₅ |
| 31 | —C₆H₃(Br)—SO₂—(CH₂)₁₅—CH₃ | Same as above. |

The following preparations illustrate how the color couplers of the invention can be prepared.

Preparation 1: compound 20 a. Potassium salt of o-sulphobenzylcyanide.

170 g. of tolylsultone (Ann. 565,34 (1949)) (1949)) and 71.5 g. of potassium cyanide are boiled for 1 h in 1 liter of methanol. After cooling the crystalline potassium salt formed is filtered off and dried at 100° C. Melting point: 303° C.

b. o-sulphophenylacetic anhydride.

117 g. of the compound prepared in step a) are boiled for 2 hours in 100 ml. of acetic acid, 30 ml. of water and 200 ml. of concentrated hydrochloric acid. The reaction mixture is evaporated till dry.

42 g. of crude potassium salt of o-sulphophenylacetic acid are treated with 65 g. of thionyl chloride and the mixture is refluxed for 1 hour. The residue obtained by evaporation under reduced pressure is taken up in boiling benzene. Upon cooling the crystalline product formed is filtered off.
Melting point : 109° C.

c. 23 g. of 1-(2-n-hexadecylthio-5-chlorophenyl)-3-amino-2-pyrazolin-5-one (prepared as described in British Pat. Specification 1,044,959, preparation 7 ) and 11.2 g. of o-sulphophenylacetic anhydride are refluxed for 2 hours in 160 ml. of anhydrous benzene. 100 ml. of benzene are removed by evaporation whereupon 100 ml. of acetonitrile are added. The precipitate formed is filtered and dried at 100° C.
Yield : 32 g.

Preparation 2: compound 22

49.2 g. of 1-(4-N-n-hexadecyl-N-methylsulphamoylphenyl)- 3-amino-2-pyrazolin-5-one (prepared as described in British Pat. Specification 1,044,959, preparation 3) and 24 g. of sulphoacetic acid pyridine salt are suspended in 160 ml. of dry benzene and 80 ml. of pyridine. The suspension is cooled to 5° C. whereupon 4.5 ml. of phosphorous trichloride in 25 ml. of benzene are added in 30 minutes. The mixture is stirred for 1 hour at 5° C. and then refluxed for 3 hours. A solution of 8 g. of sodium hydroxide and 34 g. of sodium acetate in 60 ml. of water is added whereupon the mixture is heated at 75° C. for 30 minutes. The solution is concentrated by evaporation under reduced pressure and the solid residue is dissolved in 5 N sodium hydroxide. The solution is acidified to pH 3 and the sodium sulfonate formed is filtered and dried under reduced pressure at 100° C.

Preparation 3: compound 24

46.3 g. of 1-(2-n-hexadecylsulphonylphenyl)-3-amino-2-pyrazolin-5-one (prepared as described in British Pat. Specification 1,044,959, preparation 5) and 32.5 g. of α-sulphophenylacetic acid pyridine salt (J.Am.Chem.Soc. 75, 1652 (1953)) are suspended in 160 ml. of benzene and 80 ml. of pyridine. After cooling to 5° C. a solution of 4.5 ml. of phosphorus trichloride in 25 ml. of benzene is added. The mixture is stirred for 1 hour at room temperature whereupon it is refluxed for 3 hours. 8 g. of sodium hydroxide and 34 g. of sodium acetate in 60 ml. of water are added whereupon the mixture is heated for 30 minutes at 75° C. The reaction mixture is concentrated by evaporation under reduced pressure whereupon the dry residue is dissolved in 5 N sodium hydroxide. The solution is acidified by means of 3 N hydrochloric acid to pH 3 whereupon sodium chloride is added at 100° C. The oil that separates is allowed to solidify and filtered off. The product is recrystallized from methanol and water.

Preparation 4: compound 26

46.3 g. of 1-(2-n-hexadecylsulphonylphenyl)-3-amino-2-pyrazolin-5-one (prepared as described in British Pat. Specification 1,044;959, preparation 5) and 24.7 g. of α-sulphoisobutyric acid pyridine salt (Helv.Chim.Acta 45, 717–728 (1962) are suspended in a mixture of 200 ml. of benzene and 100 ml. of pyridine. The mixture is cooled to 5°

C. whereupon a solution of 4.5 ml. of phosphorus trichloride in 25 ml. of benzene is added. The reaction mixture is refluxed for 3 hours and concentrated by evaporation under reduced pressure. The solid residue is taken up in 60 ml. of water to which 8 g. of sodium hydroxide and 34 g. of sodium acetate have been added. The mixture is kept for 15 min. at 60° C. whereupon the sodium salt is salted out by addition at the boiling temperature of sodium chloride. The sodium salt is separated and redissolved in warm water. By addition of concentrated hydrochloric acid the free sulfonic acid is precipitated.

Preparation 5: compound 28 a. o-carboxybenzylsulphonic anhydride.

556 g. of crystalline sodium sulfite in 1 l. of water and 303 g. of o-cyanobenzyl chloride (J.Am.Chem.Soc. 47, 2191 (1925)) are boiled for 6 hours. Upon cooling 380 g. of o-cyanobenzyl sulfonic acid sodium salt are obtained. 164 g. of this sodium salt are boiled for 48 hours with 1.7 l. of 5 N hydrochloric acid whereupon the mixture is concentrated to 380 ml. and cooled. The o-carboxybenzyl sulfonic acid sodium salt formed is separated.

178 g. of o-carboxybenzyl sulfonic acid sodium salt and 425 g. of thionyl chloride are boiled for 30 min. The thionyl chloride is removed by evaporation and the residue is recrystallized from toluene.
Melting point: 110° C.

b. 49.8 g. of 1-(2-chloro-4-n-hexadecylsulphonylphenyl)-3-amino-2-pyrazolin-5-one (prepared as described in British Pat. Specification 1,044,959 preparation 4) and 21.8 g. of o-carboxybenzylsulphonic anhydride are boiled for 5 hours in 250 ml. of xylene. The mixture is cooled to 80° C. whereupon 250 ml. of acetonitrile are added. The precipitate formed is filtered off and recrystallized from a mixture of isopropylether and ethylene glycol monomethyl ether.

The magenta color formers according to the present invention are of the nondiffusible type i.e. they comprise in their molecule an organic radical sufficiently large for preventing the color coupler of wandering from the colloid layer, in which the coupler is incorporated, to another colloid layer.

For preparing a photographic multilayer color material the nonmigratory color couplers for each color separation image are usually incorporated into the coating compositions of the differently sensitized silver halide emulsion layers. However, the said color couplers may also be added to the coating compositions of nonlight-sensitive colloid layers which are in water-permeable relationship with the light-sensitive silver halide emulsion layers.

During the preparation of the light-sensitive color material the nonmigratory magenta-forming color couplers according to the present invention can be incorporated in the coating composition of the silver halide emulsion layers or other colloid layers in water-permeable relationship therewith according to any technique know by those skilled in the art for incorporating photographic ingredients, more particularly color couplers, into colloid compositions. For instance, the color couplers according to the present invention, which contain water-solubilizing sulphogroups (in acid or salt form) can be incorporated into the coating composition of the layer in question from a mere aqueous or aqueous alkali solution. When the said color couplers are insufficiently water-soluble they can be incorporated into the said coating composition from a solution in the appropriate water-miscible or water-immiscible high-boiling or low-boiling organic solvents or mixtures thereof thereupon the solution obtained is dispersed, if necessary in the presence of a wetting or dispersing agent, in a hydrophilic colloid composition forming or forming part of the binding agent of the colloid layer. The hydrophilic colloid composition may of course comprise in addition to the colloid carrier all other sorts of ingredients.

The solution of the color coupler need not necessarily be dispersed or dissolved directly in the coating composition of the silver halide emulsion layer or other water-permeable colloid layer. Said emulsion may advantageously be first dispersed or dissolved in an aqueous nonlight-sensitive hydrophilic colloid solution whereupon the resultant mixture, if necessary after the removal of the organic solvents employed, is intimately mixed with the said coating composition of the light-sensitive silver halide emulsion layer or other water-permeable colloid layer just before coating. For more details about particularly suitable dispersing techniques that can be employed for incorporating the color couplers of the invention into a hydrophilic colloid layer of a photographic material there can be referred to British Pat. Specification Nos. 1,099,414, 1,099,415, 1,099,416, 1,098,594, 1,099,417, 791,219, to British Pat. application No. 46,459/67, to Belgian Pat. Specification No. 705,889 and to U.S. Pat. Specification No. 2,304,940.

The couplers according to the invention may be used in conjunction with various kinds of photographic emulsions. Various silver salts may be used as the sensitive salt such as silver bromide, silver iodide, silver chloride or mixed silver halides such as silver chlorobromide, silver bromoiodide and silver chlorobromoiodide. The couplers can be used in emulsions of the mixed packet type as described in U.S. Pat. Specification No. 2,698,794 or emulsions of the mixed grain type as described in U.S. Pat. Specification No. 2,592,243. The color couplers can be used with emulsions wherein latent images are formed predominantly on the surface of the silver halide crystal, or with emulsions wherein latent images are formed predominantly inside the silver halide crystal.

The hydrophilic colloid used as the vehicle for the silver halide may be, for example, gelatin, colloidal albumin, zein, casein, a cellulose derivative, a synthetic hydrophilic colloid such as polyvinyl alcohol, poly-N-vinyl pyrrolidone, etc. If desired, compatible mixtures of two or more of these colloids may be employed for dispersing the silver halide.

The light-sensitive silver halide emulsions of use in the preparation of a photographic material according to the present invention may be chemically as well as optically sensitized. They may be chemically sensitized by effecting the ripening in the presence of small amounts of sulfur containing compounds such as allyl thiocyanate, allyl thiourea, sodium thiosulphate, etc. The emulsions may also be sensitized by means of reductors for instance tin compounds as described in French Pat. Specification No. 1,146,955 and in Belgian Pat. Specification No. 568,687, imino-amino methane sulfinic acid compounds as described in British Pat. Specification No. 789,823 and small amounts of noble metal compounds such as gold, platinum, palladium, iridium, ruthenium and rhodium. They may be optically sensitized by means of cyanine and merocyanine dyes.

The said emulsions may also comprise compounds which sensitize the emulsions by development acceleration for example compounds of the polyoxyalkylene type such as alkylene oxide condensation products as described among others in U.S. Pat. Specification Nos. 2,531,832 and 2,533,990, in British Pat. Specification Nos. 920,637, 940,051, 945,340 and 991,608 and in Belgian Pat. Specification No. 648,710 and onium derivatives of amino-N-oxides as described in British Pat. Specification No. 1,121,696.

Further, the emulsions may comprise stabilizers e.g. heterocyclic nitrogen-containing thioxo compounds such as benzothiazoline-2-thione and 1-phenyl-2-tetrazoline-5-thione and compounds of the hydroxytriazolopyrimidine type. They can also be stabilized with mercury compounds such as the mercury compounds described in Belgian Pat. Specification Nos. 524,121, 677,337 and 707,386 and British Pat. Specification No. 3,179,520.

The light-sensitive emulsions may also comprise all other kinds of ingredients such as plasticizers, hardening agents, wetting agents, etc.

The nondiffusing magenta color formers described in the present invention are usually incorporated into a green-sensitized silver halide emulsion layer of a photographic multilayer color material. Such photographic multilayer color material usually comprises a red-sensitized silver halide emulsion layer with a cyan color former, a green-sensitized silver halide emulsion layer with a magenta color former and a blue-sensitive silver halide emulsion layer with a yellow color former.

The emulsions can be coated on a wide variety of photographic emulsion supports. Typical supports include cellulose ester film, polyvinylacetal film, polystyrene film, polyethylene terephthalate film and related films of resinous materials, as well as paper and glass.

For the production of photographic color images according to the present invention an exposed silver halide emulsion layer is developed with an aromatic primary aminodeveloping substance in the presence of a color coupler according to the present invention. All color developing agents capable of forming azomethine dyes can be utilized as developers. Suitable developing agents are aromatic compounds such as p-phenylene diamine and derivatives for example N,N-dialkyl-p-phenylene diamines such as N,N-diethyl-p-phenylene diamine, N,N-dialkyl-N'-sulphomethyl-p-phenylene diamines, and N,N-dialkyl-N'-carboxymethyl-p-phenylene diamines.

As will be proved hereinafter by means of comparative tests the magenta color formers of the invention form on color development with aromatic primary amines such as N,N-diethyl-p-phenylene diamine magenta dyes having favorable light-absorption characteristics and showing good resistance to heat and humidity as compared with the dyes formed from known magenta forming color couplers.

The following table gives a clear idea about the light-absorption characteristics of dyestuffs formed on color development by reaction of the oxidation product of N,N-diethyl-p-phenylene diamine with color couplers according to the present invention and a color coupler analogous to those described in Belgian Pat. Specification No. 516,025. As can be seen from this table the dyes formed according to the invention have less side-absorption in the blue region of the spectrum than the dyes formed with the said color coupler according to Belgian Pat. Specification No. 516,052. The side-absorptions are given in percentage, relative to the absorption in the green region of the spectrum.

| Colour coupler | Percent absorption in the— | | | Absorption maximum (nm.) |
|---|---|---|---|---|
|  | Blue | Green | Red |  |
| Compound 9 | 20 | 100 | 10 | 542 |
| Compound 10 | 20 | 100 | 7 | 536 |
| Compound 13 | 18 | 100 | 6 | 536 |

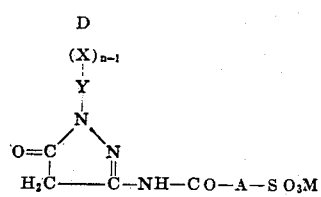

| | 26 | 100 | 10 | 538 |

The resistance to humidity and heat of the dyes formed according to the present invention as compared with known dyes is determined from the variation in density (in percent at a density value of 0.5 of a developed wedge print after having stored said print for 24 hours at 60° C. and 100 percent of relative humidity while being protected from light.

The following table gives a clear idea about the resistance to humidity and heat of dyestuffs formed on color development by reaction of the oxidation product of N,N-diethyl-p-phenylene diamine with color couplers according to the present invention and known color couplers according to British Pat. Specification No. 1,044,959. As can be seen from said table the dyes formed with the said known color couplers show a high increase in density upon storing as indicated above whereas the dyes formed with the color couplers according to the present invention are quite stable in conditions of high humidity and heat in that they show only a slight variation in density or no variation at all.

In the following table is also listed the yellow fog (blue absorption) formed before and after storing at 60° C. and 100 percent of relative humidity for 24 hours and it appears that with the color couplers of the invention less yellow fog is produced than with the known color couplers.

| Colour couplers | Percent variation in density at D=0.5 | Yellow fog Before storing | Yellow fog After storing |
|---|---|---|---|
| 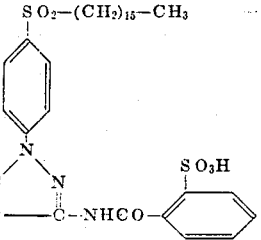 | | | |
| Compound 6 | +32 | 0.07 | 0.19 |
|  | 0 | 0.09 | 0.12 |
| 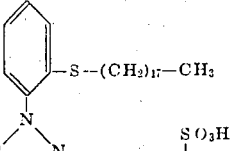 | | | |
| Compound 13 | +20 | 0.10 | 0.21 |
| Compound 10 | −6 | 0.08 | 0.11 |
|  | +6 | 0.09 | 0.15 |
| 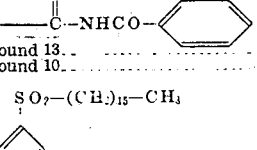 | | | |
| Compound 28 | +20 | 0.06 | 0.10 |
|  | −2 | 0.06 | 0.08 |

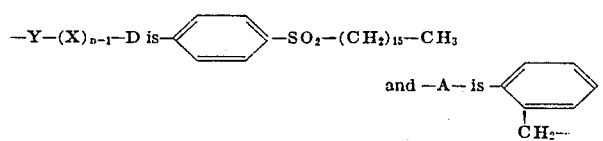

We claim:
1. A photographic material comprising a silver halide emulsion layer and at least one color coupler corresponding to the formula:

D
(X)ₙ₋₁
Y
N
O=C    N
H₂C——C—NH—CO—A—SO₃M wherein:
Y stands for a bivalent aromatic group,
X stands for oxygen, sulphur, sulphonyl, —SO₂N(R)—R being hydrogen or lower alkyl, —CONH— or —N(alkyl)—,
D represents a residue rendering the molecule fast to diffusion and comprising from five to 20 carbon atoms, $n$ stands for 1 or 2, A stands for

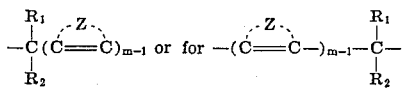

wherein $m = 1$ or 2 and each of $R_1$ and $R_2$ stands for hydrogen, alkyl or aryl, $R_1$ and $R_2$ both being hydrogen when $m=2$, and Z represents the atoms necessary to complete an aromatic nucleus, and M stands for hydrogen, an alkali metal atom or an ammonium group.

2. Photographic material of claim 1 which is a multilayer color material comprising said color coupler in a light-sensitive silver halide emulsion layer or in a nonlight-sensitive water-permeable colloid layer in water-permeable relationship with said light-sensitive silver halide emulsion layer.

3. Photographic multilayer color material of claim 2 comprising three silver halide emulsion layers which are differently optically sensitized, one of said layers being green sensitized, and wherein said green-sensitized silver halide emulsion layer or a nonlight-sensitive water-permeable colloid layer adjacent thereto incorporates said color coupler.

4. Process for the production of a photographic color image by development of a photographic element containing imagewise exposed silver halide with the aid of a developing agent, which by reduction of the exposed silver halide is converted into its oxidized form and as such forms a magenta azomethine dye by reaction with at least one color coupler corresponding to the formula:

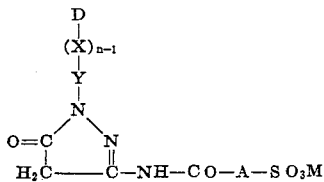

wherein:

Y stands for a bivalent aromatic group,

X stands for oxygen, sulfur, sulphonyl, —SO²N(R)—R being hydrogen or lower alkyl, —CONH— or —N(alkyl)—, D represents a residue rendering the molecule fast to diffusion and comprising from five to 20 carbon atoms, $n$ stands for 1 or 2, A stands for

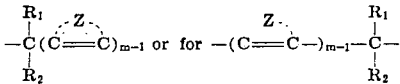

wherein $m=1$ or 2 and each of $R_1$ and $R_2$ stands for hydrogen, alkyl or aryl, $R_1$ and $R_2$ both being hydrogen when $m=2$, and Z represents the atoms necessary to complete an aromatic nucleus, and M stands for hydrogen, an alkali metal atom or an ammonium group.

5. The photographic material of claim 1 wherein Y is phenylene.

6. The photographic material of claim 1 wherein

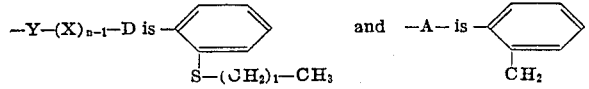

7. The photographic material of claim 1 wherein

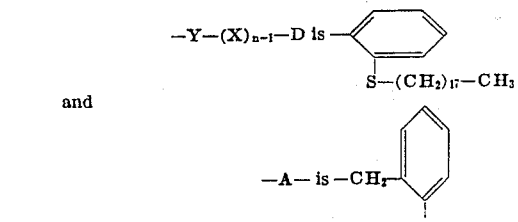

8. The photographic material of claim 1 wherein

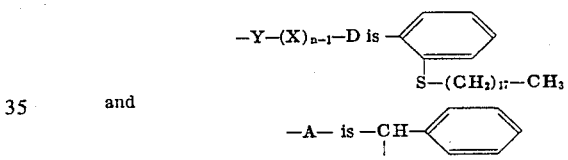

9. The photographic material of claim 1 wherein

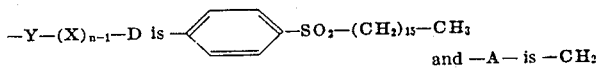

10. The photographic material of claim 1 wherein